(12) United States Patent
Yuan et al.

(10) Patent No.: US 10,298,047 B2
(45) Date of Patent: May 21, 2019

(54) DYNAMIC NATURAL ADAPTIVE CHARGING METHOD

(71) Applicant: EBULL POWER INNOVATIONS LTD, Suzhou (CN)

(72) Inventors: Bo Yuan, Suzhou (CN); Guanghui Yuan, Suzhou (CN)

(73) Assignee: EBULL POWER INNOVATIONS LTD, Suzhou (CN)

( * ) Notice: Subject to any disclaimer, the term of this patent is extended or adjusted under 35 U.S.C. 154(b) by 95 days.

(21) Appl. No.: 15/663,737

(22) Filed: Jul. 29, 2017

(65) Prior Publication Data

US 2018/0062411 A1    Mar. 1, 2018

Related U.S. Application Data

(63) Continuation of application No. PCT/CN2015/097556, filed on Dec. 16, 2015.

(30) Foreign Application Priority Data

Jan. 29, 2015    (CN) .......................... 2015 1 0048325

(51) Int. Cl.
  *H02J 7/00*    (2006.01)
(52) U.S. Cl.
  CPC .......... *H02J 7/0093* (2013.01); *H02J 7/0016* (2013.01); *H02J 7/0052* (2013.01); *Y02E 70/40* (2013.01)
(58) Field of Classification Search
  USPC ....................................................... 320/129
  See application file for complete search history.

(56) References Cited

U.S. PATENT DOCUMENTS

| | | | | | |
|---|---|---|---|---|---|
| 4,385,269 | A | * | 5/1983 | Aspinwall | H02J 7/0086 320/129 |
| 5,617,007 | A | * | 4/1997 | Keidl | H01M 10/44 320/141 |
| 5,654,622 | A | * | 8/1997 | Toya | H01M 10/44 320/129 |
| 5,744,937 | A | * | 4/1998 | Cheon | H02J 7/0006 320/106 |
| 5,986,437 | A | * | 11/1999 | Lee | G06F 1/26 320/125 |
| 5,994,875 | A | * | 11/1999 | Lee | H02J 7/0077 320/132 |
| 6,275,006 | B1 | * | 8/2001 | Koike | H02J 7/0073 320/125 |

(Continued)

*Primary Examiner* — Samuel Berhanu
(74) *Attorney, Agent, or Firm* — W&K IP (Wayne & King)

(57) ABSTRACT

A dynamic natural adaptive charging method, comprises: (a) connecting a charger with a main charging circuit of a lithium battery pack to be charged and a BMS communication interface, regulating an excitation voltage of the charger to a voltage of the lithium battery pack to be charged, and switching on the charger and the lithium battery pack to be charged when the output voltage of the charger is equal to the voltage of the battery pack; (b) increasing the excitation voltage by 0.6 to 1V for charging until the charging current is decreased to a first set value; (c) repeating step (b) until voltages of all single batteries in the lithium battery pack to be charged reach a second set value; and (d) regulating the excitation voltage to a nominal voltage of the lithium battery pack to be charged and charging with the maximum output current of the charger.

7 Claims, 2 Drawing Sheets

(56) References Cited

U.S. PATENT DOCUMENTS

| | | | | |
|---|---|---|---|---|
| 8,106,629 B2* | 1/2012 | Lai | ........................ | H02J 7/0073 |
| | | | | 320/128 |
| 8,816,648 B2* | 8/2014 | Bhardwaj | ............. | H02J 7/0073 |
| | | | | 320/152 |
| 8,896,272 B2* | 11/2014 | Hawawini | ............. | H02J 7/0073 |
| | | | | 320/148 |
| 9,472,965 B2* | 10/2016 | Nilles | .................... | H02J 7/0044 |
| 2015/0084602 A1* | 3/2015 | Sawyers | ............... | H01M 10/46 |
| | | | | 320/134 |

* cited by examiner

DYNAMIC NATURAL ADAPTIVE CHARGING METHOD

CROSS-REFERENCE TO RELATED APPLICATIONS

This application is a continuation of International Patent Application No. PCT/CN2015/097556 with a filing date of Dec. 16, 2015, designating the U.S., now pending, and further claims priority to Chinese Patent Application No. 201510048325.1 with a filing date of Jan. 29, 2015. The content of the aforementioned applications, including any intervening amendments thereto, are incorporated herein by reference.

TECHNICAL FIELD

The present invention belongs to the technical field of charging, and particularly relates to a dynamic natural adaptive charging method.

BACKGROUND OF THE PRESENT INVENTION

In an electrochemical reaction process of charging and discharging of a lithium ion battery, a molecular structure of electrode material of the lithium ion battery is not changed theoretically (i.e., the electrochemical reaction process is a topotactic reaction). However, practices prove that overdischarge of the battery often causes local collapse of the molecular structure of the lithium ion battery, and has a great influence on life of the lithium ion battery. For example, relevant standards of the lithium ion battery specify that: a cut-off discharging voltage of a single lithium ion battery is 2.5V to 2.7V. However, in actual application, a voltage of the single lithium ion battery is often lower than this voltage, causing overdischarge of the battery. The molecular structure of an electrode of the overdischarged battery may generate the local collapse. The local collapse is repairable, and needs to be repaired during charging.

An existing charging technology of the lithium ion battery follows a charging habit of a lead acid battery, i.e., a charging voltage of each phase is manually set for charging in a constant-current and constant-voltage mode. Such charging mode causes too large or too small potential gradient inside the battery, or causes unreasonable current supply capability, cannot ensure that an electrochemical reaction of battery charging is performed according to objective actual conditions of the battery, and causes too low charging efficiency. Even some processes obviously violate a rule of the electrochemical reaction, causing an influence on the service life of the battery due to damage to the battery.

SUMMARY OF PRESENT INVENTION

The purpose of the present invention is to overcome defects of the prior art, so as to provide a dynamic natural adaptive charging method capable of charging a battery pack with a charger by automatically regulating charging current according to an actual capacity and a power-lack state of the battery pack.

To achieve the above purpose, a technical solution adopted by the present invention is as follows: a dynamic natural adaptive charging method comprises the following steps:

(a) connecting a charger with a lithium battery pack to be charged, regulating an excitation voltage of the charger to be equal to a voltage of the lithium battery pack to be charged, and switching on the charger and the lithium battery pack to be charged;

(b) increasing the excitation voltage to perform repair charging until the charging current is decreased to a first set value, wherein increasing the excitation voltage means progressively increasing the excitation voltage at an amplitude of 0.6 to 1V;

(c) repeating step (b) until voltages of all single batteries in the lithium battery pack to be charged reach the set value; and (d) regulating the excitation voltage to a nominal voltage of the lithium battery pack to be charged; charging with a maximum current driving capability of the charger; and progressively decreasing the charging current at an amplitude of 5% to 10% when the voltages of the single batteries reach a cut-off charging voltage, until the charging current of the single batteries is decreased to a cut-off charging current.

Preferably, in step (b), the repair charging is a pulse charging process including pause and discharge.

Further, in step (b), the first set value of the charging current is 1 A, and the excitation voltage is progressively increased when the charging current is less than 1 A.

Further, in step (b), in the pulse charging process, a charging pulse width is 1000 to 2000 ms, a discharging pulse width is 5 to 10 ms and a pause pulse width between charge and discharge is 100 to 200 ms.

Preferably, in step (c), a voltage set value of the single batteries is 3.0 to 3.3V.

Through application of the above technical solution, compared with the prior art, the present invention has the following advantages that: the dynamic natural adaptive charging method of the present invention abandons a conventional constant-current or constant-voltage charging mode, first adopts a low-current repair charging process with progressively increased excitation voltage, then performs a quick charging process with progressively decreased large current, and can prevent overcharge without reserving charging allowance on the basis of an original cut-off charging voltage; and the dynamic natural adaptive charging method can charge a battery pack with a charger by automatically regulating the charging current according to an actual capacity and a power-lack state of the battery pack, and ensures quicker and fuller charging of the battery without overcharge.

DETAILED DESCRIPTION OF PREFERRED EMBODIMENTS

The present invention will be further described below in combination with drawings and embodiments.

Figure 1:
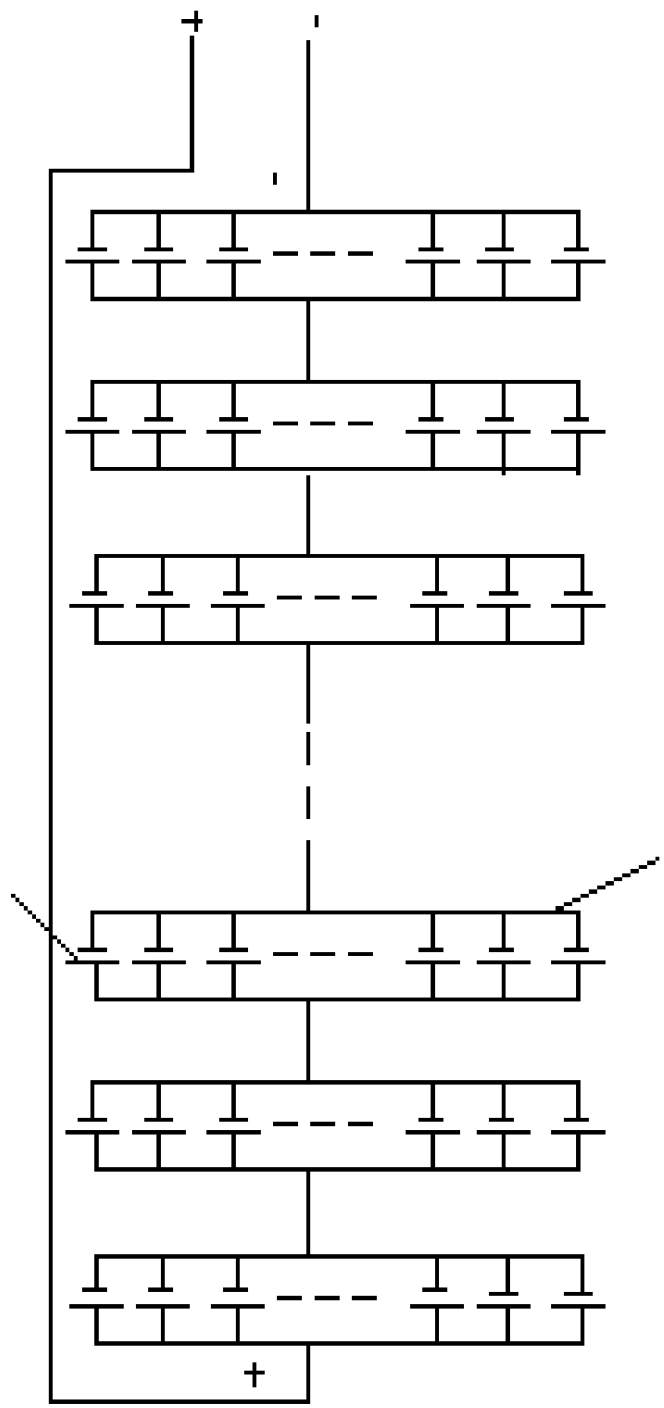
FIG. 1 is a connection diagram of a lithium ion battery pack.
Figure 2:
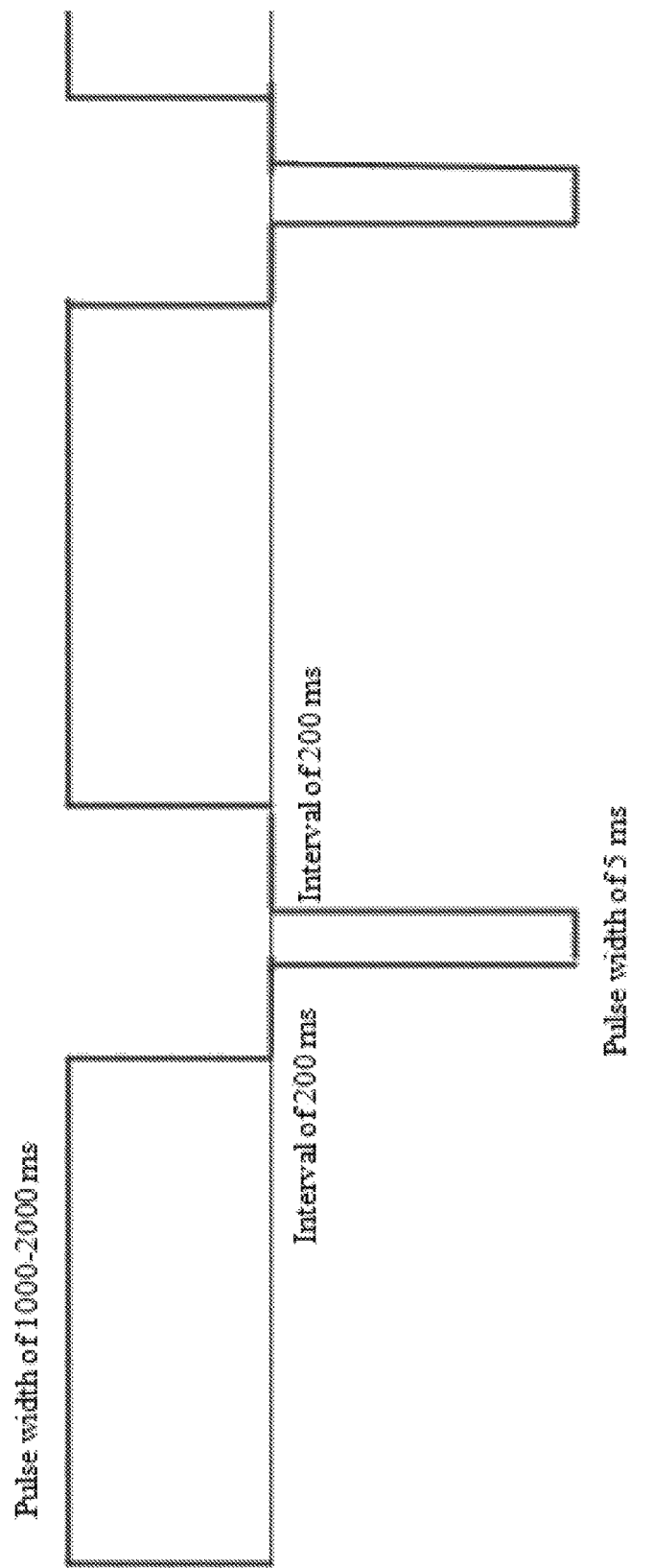
FIG. 2 is a schematic diagram of a repair pulse charging process in a dynamic natural adaptive charging method of the present invention.

The dynamic natural adaptive charging method of the present invention comprises the following steps:

(a) a conventional lithium battery pack is generally shown in FIG. 1 and is generally formed by connecting a plurality of single batteries in series and in parallel: a plurality of single batteries connected in parallel form one section of the lithium battery pack; for example, a lithium battery pack of 48V generally includes 13 sections; the specific step includes: connecting a charger with a lithium battery pack to be charged, regulating an excitation voltage of the charger to be equal to a voltage of the lithium battery pack to be charged, and switching on the charger and the lithium battery pack to be charged (i.e., detecting voltages on both ends of the lithium battery pack to be charged and the excitation voltage in the charger; and when the voltages are equal, closing an output relay of the charger to start to charge), wherein in an initial state, the excitation voltage of the charger is equal to the voltages on both ends of the lithium battery pack to be charged and then the current is 0; the charger is connected with a main charging circuit of the lithium battery pack to be charged and a BMS communication interface; power is supplied; and a main output switch of the charger is switched on for charging at the moment that the output voltage of the charger is equal to the voltage of the battery pack;

(b) increasing the excitation voltage by 0.6 to 1V for charging, wherein charging current generated by slightly increasing the excitation voltage is small (i.e., a low-current repair charging process) to prevent an overdischarged battery from forming uncontrolled current when a battery electrode plate is damaged, so as to avoid impacting the damaged molecular structure for repairing the molecular structure of the overdischarged battery for achieving the purpose of repairing and maintaining space sizes of a layered structure and a tunnel structure of the molecular structure of the lithium ion battery and ensuring a smooth channel; and progressively decreasing the charging voltage to the first set value (the first set value is 1 A) with the increase of the voltage of the battery, wherein in the process, the low current is preferably used for performing the pulse repair charging process; as shown in FIG. 2: a charging pulse width is 1000 to 2000 ms, a discharging pulse width is 5 to 10 ms (5 ms in the present embodiment), and a pause pulse width between charge and discharge is 100 to 200 ms (i.e., discharging after a pause of 100 to 200 ms from charging, and charging after a pause of 100 to 200 ms from discharging, and a pause interval in the present embodiment is 200 ms); in this way, positions and forms of ions and impurities are further regulated and smoothness of a one-dimensional space (the tunnel structure) and a two-dimensional space (the layered structure) of the lithium ion battery is ensured;

(c) repeating step (b) until voltages of all single batteries in the lithium battery pack to be charged reach the set value (generally 3.0 to 3.3V, it can be seen that the above voltage increase process is a progressive increase process of the voltage); and entering a main phase of energy storage of the lithium ion battery for charging at battery-acceptable current (large current) so as to accelerate charging speed; and (d) regulating the excitation voltage to a nominal voltage of the lithium battery pack to be charged; charging with a maximum current driving capability of the charger (i.e. a capability of the output current), wherein the current driving capability of the charger is determined by hardware of a switching power supply thereof; it is noted that it is not constant-current charging herein, but the charging current at the beginning of charging in the step is a maximum output current of the charger and the charging current is gradually decreased as the charging is performed; when a voltage maximum value of the single batteries in the battery pack reaches the cut-off charging voltage (i.e., a set threshold, generally 4.15 to 4.17V) of the single batteries specified by a battery manufacturer, the charging current is progressively decreased (an amplitude of progressive decrease of the output current is 5% to 10%); and repeating like this and ending the charging until the charging current of the single batteries is decreased to a cut-off charging current specified by the battery manufacturer.

The present invention abandons a conventional constant-current or constant-voltage manual-setting charging mode, and can charge according to the actual capacity and the power-lack state of the battery pack. The present invention first adopts a low-current repair charging process with progressively increased excitation voltage, then performs a large-current quick charging process with progressively decreased charging current, and can prevent overcharge without reserving allowance on the basis of an original total charging voltage. The battery can be charged more quickly and fully without overcharge.

Above embodiments are only used to describe technical concepts and features of the present invention, and are intended to enable those skilled in the art to understand and implement contents of the present invention, not to limit the protection scope of the present invention. Any equivalent change or modification made according to the spiritual essence of the present invention shall be covered within the protection scope of the present invention.

We claim:

1. A dynamic natural adaptive charging method, comprising the following steps:
    (a) connecting a charger with a lithium battery pack to be charged, regulating an excitation voltage of the charger to be equal to a voltage of the lithium battery pack to be charged, and switching on the charger and the lithium battery pack to be charged;
    (b) increasing the excitation voltage to perform repair charging until the charging current is decreased to a first set value, wherein increasing the excitation voltage means progressively increasing the excitation voltage at an amplitude of 0.6 to 1V;
    (c) repeating step (b) until voltages of all single batteries in the lithium battery pack to be charged reach a second set value; and
    (d) regulating the excitation voltage to a nominal voltage of the lithium battery pack to be charged; charging with a maximum current driving capability of the charger; and progressively decreasing the charging current at an amplitude of 5% to 10% when the voltages of the single batteries reach a cut-off charging voltage, until the charging current of the single batteries is decreased to a cut-off charging current.

2. The dynamic natural adaptive charging method according to claim 1, wherein in step (b), the repair charging is a pulse charging process including a pause and discharge.

3. The dynamic natural adaptive charging method according to claim 1, wherein in step (b), the first set value of the charging current is 1 A, and the excitation voltage is progressively increased when the charging current is less than 1 A.

4. The dynamic natural adaptive charging method according to claim 2, wherein in step (b), the first set value of the charging current is 1 A, and the excitation voltage is progressively increased when the charging current is less than 1 A.

5. The dynamic natural adaptive charging method according to claim 1, wherein in step (b), in the pulse charging process, a charging pulse width is 1000 to 2000 ms, a discharging pulse width is 5 to 10 ms and a pause pulse width between charge and discharge is 100 to 200 ms.

6. The dynamic natural adaptive charging method according to claim 2, wherein in step (b), in the pulse charging process, a charging pulse width is 1000 to 2000 ms, a discharging pulse width is 5 to 10 ms and a pause pulse width between charge and discharge is 100 to 200 ms.

7. The dynamic natural adaptive charging method according to claim 1, wherein in step (c), the second set value of voltages of the single batteries is 3.0 to 3.3V.

\* \* \* \* \*